United States Patent
Moriya

(10) Patent No.: US 10,491,875 B2
(45) Date of Patent: Nov. 26, 2019

(54) IMAGE PROCESSING APPARATUS AND IMAGE PROCESSING METHOD

(71) Applicant: SAMSUNG ELECTRONICS CO., LTD., Suwon-si (KR)

(72) Inventor: Tsuyoshi Moriya, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 15/758,208

(22) PCT Filed: Sep. 2, 2016

(86) PCT No.: PCT/KR2016/009833
§ 371 (c)(1),
(2) Date: Mar. 7, 2018

(87) PCT Pub. No.: WO2017/043811
PCT Pub. Date: Mar. 16, 2017

(65) Prior Publication Data
US 2018/0249141 A1    Aug. 30, 2018

(30) Foreign Application Priority Data

Sep. 9, 2015  (JP) ................... 2015-177325
Apr. 20, 2016  (KR) .............. 10-2016-0048258

(51) Int. Cl.
H04N 9/77    (2006.01)
G06T 5/00    (2006.01)
H04N 9/73    (2006.01)

(52) U.S. Cl.
CPC ............. *H04N 9/77* (2013.01); *G06T 5/008* (2013.01); *H04N 9/73* (2013.01)

(58) Field of Classification Search
CPC . H04N 9/77; H04N 9/735; H04N 9/73; G06T 5/008
See application file for complete search history.

(56) References Cited

U.S. PATENT DOCUMENTS 6,788,339 B1 *   9/2004   Ikeda ................. H04N 9/735
                                                        348/223.1
8,503,771 B2     8/2013   Masato
(Continued)

FOREIGN PATENT DOCUMENTS

JP    2003-163944 A   6/2003
JP    2008219838 A    9/2008
(Continued)

OTHER PUBLICATIONS

International Search Report, issued by International Searching Authority in corresponding International Application No. PCT/KR2016/009833, dated Nov. 24, 2016.
(Continued)

*Primary Examiner* — Timothy J Henn
(74) *Attorney, Agent, or Firm* — Sughrue Mion, PLLC

(57) ABSTRACT

The image processing apparatus includes a shading estimation unit estimating a shading intensity of an image, a light source color estimation unit setting an achromatic color determination range corresponding to the estimated shading intensity, as a color space, a correction coefficient calculating unit calculating a white balance gain, and an image signal processing circuit correcting a white balance.

15 Claims, 13 Drawing Sheets

(56) References Cited

U.S. PATENT DOCUMENTS

| | | | |
|---|---|---|---|
| 8,817,130 B2 | 8/2014 | Yoshino et al. | |
| 9,479,708 B2 | 10/2016 | Yamada et al. | |
| 2005/0213128 A1* | 9/2005 | Imai | H04N 1/6077 |
| | | | 358/1.9 |
| 2011/0273583 A1* | 11/2011 | Yoshino | H04N 9/735 |
| | | | 348/223.1 |
| 2012/0050563 A1* | 3/2012 | Cote | H04N 5/235 |
| | | | 348/223.1 |
| 2015/0009358 A1 | 1/2015 | Jung et al. | |
| 2016/0005348 A1* | 1/2016 | Yanagi | G09G 3/20 |
| | | | 345/600 |
| 2017/0094241 A1* | 3/2017 | Fujiwara | H04N 1/46 |

FOREIGN PATENT DOCUMENTS

| | | |
|---|---|---|
| JP | 2010177917 A | 8/2010 |
| JP | 2013198041 A | 9/2013 |
| JP | 2015005927 A | 1/2015 |
| JP | 2015-23376 A | 2/2015 |
| KR | 1020110016812 A | 2/2011 |
| KR | 1020120069539 A | 6/2012 |
| KR | 1020130069331 A | 6/2013 |

OTHER PUBLICATIONS

Written Opinion issued by the International Bureau in corresponding International Application No. PCT/KR2016/009833, dated Nov. 24, 2016.

Office Action dated Jun. 18, 2019 by the Japanese Patent Office in counterpart Japanese Patent Application No. 2015-177325.

* cited by examiner

FIG. 12

| SUBJECT BRIGHTNESS | LOW BRIGHTNESS | | | | | | MIDDLE BRIGHTNESS | HIGH BRIGHTNESS |
|---|---|---|---|---|---|---|---|---|
| SHADING ESTIMATION COEFFICIENT | ※ | 1 | 2 | 3 | 4 | 5 | 6 | 1~6, ※ | 1~6, ※ |
| ESTIMATED LIGHT SOURCES | A | M | A | A | A | HL | L | ONE OF A, M, HL, AND L AND H | H |

※ IN CASE WHERE SHADING ESTIMATION HAS LOW RELIABILITY

IMAGE PROCESSING APPARATUS AND IMAGE PROCESSING METHOD

TECHNICAL FIELD

The present invention relates to an image processing device and an image processing method.

BACKGROUND ART

Prior Art Document
KR 2013-115571 (Patent Document 1)
JP 2015-095811 (Patent Document 2)
An image processing device such as a digital still camera adjusts white balance so that colors of a subject may be accurately reproduced regardless of a light source. For example, Patent Document 1 discloses a technique where an image processing device estimates a light source illuminating a subject of a captured image, calculates reliability of light source estimation to correct white balance of the captured image while reducing color failure. Patent Document 2 also discloses an image processing device that corrects white balance of a captured image.

White balance may be suitably corrected by using the image processing devices according to the background art. However, the image processing device according to Patent Document 1 processes reliability of light source estimation after accumulating a plurality of frames, and thus, color failure may not be prevented, for example, immediately after starting the device.

DETAILED DESCRIPTION OF THE INVENTION

Technical Problem

The present invention provides an image processing device and an image processing method, in which an image to be corrected is used to suitably estimate a light source illuminating a subject of the image and prevent color failure so as to correct white balance.

Technical Solution

An image obtaining device according to the present invention includes: an image obtaining unit configured to obtain an image; and a controller configured to previously store an achromatic color determination range for each shading intensity, and determine an achromatic color determination range corresponding to a shading intensity of the obtained image, as a color space.

The image obtaining device according to the present invention includes a controller calculating a white balance gain based on a pixel value of a pixel having color coordinates included in the determined achromatic color determination range, and correcting white balance of the image by using the calculated white balance gain.

The image obtaining device according to the present invention includes a controller calculating reliability of shading estimation based on a flatness of the image, and setting a predetermined achromatic color determination range corresponding to when the reliability is a predetermined value or less, as the color space.

The image obtaining device according to the present invention includes a controller calculating reliability of shading estimation based on a flatness of the image, and setting a predetermined achromatic color determination range corresponding to when the reliability is a predetermined value or less, as the color space.

The image obtaining device according to the present invention includes a controller selecting, when a subject brightness of the image is within a predetermined range, a plurality of achromatic color determination ranges, and generating a second achromatic color determination range based on the plurality of achromatic color determination ranges, and setting the color space by setting the second achromatic color determination range as the achromatic color determination range.

The image obtaining device according to the present invention includes a controller selecting a shading estimation coefficient for correcting the image by applying a plurality of shading estimation coefficients to the image, storing an achromatic color determination range for each of the shading estimation coefficients, and setting an achromatic color determination range corresponding to the selected shading estimation coefficient.

The image obtaining device according to the present invention includes a controller dividing the image into a plurality of blocks, and calculates a block statistical value of the pixel value for each block, wherein the shading estimation coefficient has a coefficient value corresponding to each of the blocks, wherein the controller selects a shading estimation coefficient for correcting the image by multiplying the block statistical value and the coefficient value, calculates color coordinates of the block, and calculates a white balance gain based on a block statistical value of a block having color coordinates included in a set achromatic color determination range.

An image processing device according to the present invention includes a shading estimation unit estimating a shading intensity of an image, a light source color estimation unit previously storing an achromatic color determination range for each shading intensity, and setting an achromatic color determination range corresponding to the estimated shading intensity, a correction coefficient calculation unit calculating color coordinates of a pixel in the image, and calculating a white balance gain based on a pixel value of a pixel having color coordinates included in the set achromatic color determination range, and a correction unit correcting white balance of the image by using the calculated white balance gain.

The image processing device according to the present invention includes a shading estimation unit calculating reliability of shading estimation based on a flatness of an image, and a light source color estimation unit setting a predetermined achromatic color determination range corresponding to when the reliability is a predetermined value or less, as the color space.

The image processing device according to the present invention includes a light source color estimation unit selecting, when a subject brightness of the image is within a predetermined range, a plurality of achromatic color determination ranges, and generating a second achromatic color determination range based on the plurality of achromatic color determination ranges, and setting the color space by setting the second achromatic color determination range as the achromatic color determination range.

The image processing device according to the present invention includes a shading estimation unit selecting a shading estimation coefficient for correcting an image by applying a plurality of shading estimation coefficients to the image, and a light source color estimation unit storing an achromatic color determination range for each of the shading estimation coefficients, and setting an achromatic color determination range corresponding to the selected shading estimation coefficient.

The image processing device according to the present invention further includes a statistical value calculation unit dividing an image into a plurality of blocks, and calculating a block statistical value of a pixel value for each block, wherein a shading estimation coefficient has a coefficient value corresponding to each of the blocks, wherein the a shading estimation coefficient for correcting the image is selected by multiplying the block statistical value and the coefficient value, wherein the correction coefficient calculation unit calculates color coordinates of the block, and the shading estimation unit calculates a white balance gain based on the block statistical value of a block having color coordinates included in the set achromatic color determination range.

Also, an image obtaining method according to the present invention includes: obtaining an image; estimating a shading intensity; and previously storing an achromatic color determination range of each shading intensity, and determining an achromatic color determination range corresponding to a shading intensity of the obtained image, as a color space.

The image obtaining method according to the present invention includes: calculating a white balance gain based on a pixel value of a pixel having color coordinates included in the determined achromatic color determination range; and correcting white balance of the image by using the calculated white balance gain.

The image obtaining method according to the present invention includes: calculating a white balance gain based on a pixel value of a pixel having color coordinates included in the determined achromatic color determination range; and correcting white balance of the image by using the calculated white balance gain.

The estimating of the shading intensity of the image obtaining method according to the present invention includes calculating reliability of shading estimation based on flatness of the image, wherein the setting of the achromatic color determination range as a color space includes setting a predetermined achromatic color determination range at a reliability or less as the color space.

The setting of the achromatic color determination range as a color space of the image obtaining method according to the present invention includes: selecting a plurality of the achromatic color determination ranges when a subject brightness of the image is within a predetermined range, and generating a second achromatic color determination range based on the plurality of achromatic color determination ranges; and setting the color space by setting the second achromatic color determination range as the achromatic color determination range.

The estimating of the shading intensity of the image obtaining method according to the present invention includes: selecting a shading estimation coefficient for correcting the image by applying a plurality of shading estimation coefficients to the image, wherein the setting of the achromatic color determination range as a color space includes storing an achromatic color determination range of each of the shading estimation coefficients, and setting an achromatic color determination range corresponding to the selected shading estimation coefficient.

The image obtaining method according to the present invention may further include dividing the image into a plurality of blocks and calculating a block statistical value of each of the blocks, wherein the shading estimation coefficients respectively have coefficient values respectively corresponding to the blocks, wherein the estimating of the shading intensity includes selecting a shading estimation coefficient for correcting the image by multiplying the block statistical value and the coefficient value, wherein the calculating of the shading balance gain includes: calculating color coordinates of the block; and calculating the white balance gain based on the block statistical value of a block having color coordinates included in the set achromatic color determination range.

An image processing method according to the present invention may include: storing an achromatic color determination range for each shading intensity, estimating a shading intensity of an image, setting an achromatic color determination range corresponding to an estimated shading intensity, as a color space, calculating color coordinates of a pixel in the image, and calculating a white balance gain based on a pixel value of a pixel having color coordinates included in a set achromatic color determination range, and correcting white balance of the image by using the calculated white balance gain.

The estimating of the shading intensity of the image processing method according to the present invention may include calculating reliability of shading estimation based on flatness of the image, wherein the setting of the achromatic color determination range as a color space includes setting a predetermined achromatic color determination range at a reliability or less as the color space.

The setting of the achromatic color determination range as a color space of the image processing method according to the present invention may include: selecting a plurality of the achromatic color determination ranges when a subject brightness of the image is within a predetermined range, and generating a second achromatic color determination range based on the plurality of achromatic color determination ranges; and setting the color space by setting the second achromatic color determination range as the achromatic color determination range.

The estimating of the shading intensity of the image processing method according to the present invention may include selecting a shading estimation coefficient for correcting the image by applying a plurality of shading estimation coefficients to the image, wherein the setting of the achromatic color determination range as a color space includes storing an achromatic color determination range of each of the shading estimation coefficients, and setting an achromatic color determination range corresponding to the selected shading estimation coefficient.

The image processing method according to the present invention may include dividing the image into a plurality of blocks and calculating a block statistical value of each of the blocks, wherein the shading estimation coefficients respectively have coefficient values respectively corresponding to the blocks, wherein the estimating of the shading intensity includes selecting a shading estimation coefficient for correcting the image by multiplying the block statistical value and the coefficient value, wherein the calculating of the shading balance gain includes: calculating color coordinates of the block; and calculating a white balance gain based on a block statistical value of a block having color coordinates included in the set achromatic color determination range.

According to the present invention, an image processing device and an image processing method are provided, whereby white balance may be corrected by suitably estimating a light source and preventing color failure.

DESCRIPTION OF THE DRAWINGS

FIG. 12 is a view for describing a light source estimation method according to an embodiment.

BEST MODE

Hereinafter, an image obtaining device, an image processing device, an image obtaining method, and an image processing method according to the present embodiment will be described with reference to the drawings.

According to the image obtaining device, the image processing device, the image obtaining method, and the image processing method according to the present embodiment, a light source illuminating a subject is estimated based on a shading intensity of a captured image by using a difference in shading intensities of captured images according to light sources used in capturing images, and color failure is prevented by modifying an achromatic color determination range corresponding to when calculating a white balance gain.

Figure 1:
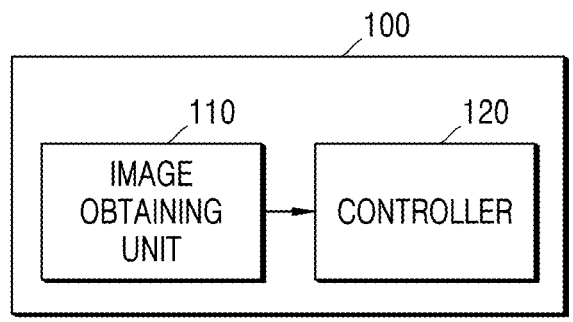
FIG. 1 is a structural block diagram illustrating an image obtaining device 100 according to an embodiment.

FIG. 1 is a structural block diagram illustrating an image obtaining device 100 according to an embodiment.

Referring to FIG. 1, the image obtaining device 100 may include an image obtaining unit 110 and a controller 120. The image obtaining device 100 may include, for example, a digital still camera, which is an electronic imaging device.

The image obtaining unit 110 includes an imaging device, and may form a subject image on an imaging surface of the imaging device or the like, and convert an image signal into a digital signal by A/D conversion.

The controller 120 may determine an achromatic color determination range corresponding to a shading intensity of an image obtained by using the image obtaining unit 110 and calculate a white balance gain based on a pixel value of a pixel having color coordinates included in the determined achromatic color determination range, and may correct a white balance of the image by using the calculated white balance gain.

Figure 2:
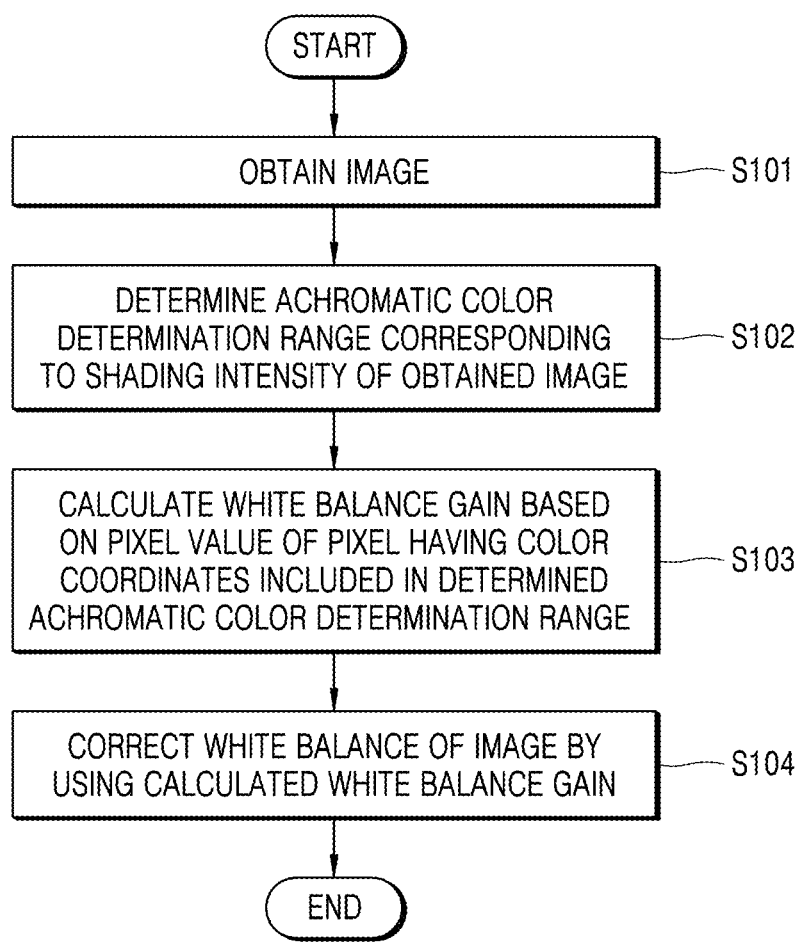
FIG. 2 is a flowchart of a processing order of an image obtaining method according to an embodiment.

FIG. 2 is a flowchart for describing an operating method in the image obtaining device 100 illustrated in FIG. 1, according to an embodiment.

In operation 101, the image obtaining unit 110 of the image obtaining device 100 obtains an image (operation S101).

In operation 102, the controller 120 of the image obtaining device 100 determines an achromatic color determination range corresponding to a shading intensity of an obtained image (operation S102).

According to an embodiment, the controller 120 calculates reliability of shading estimation based on a degree of flatness of an obtained image, and set a predetermined achromatic color determination range corresponding to the reliability which is a predetermined value or less, as a color space.

According to an embodiment, when a subject brightness of an image is within a predetermined range, the controller 120 may select a plurality of achromatic color determination ranges, and generate a second achromatic color determination range based on the plurality of achromatic color determination ranges, and set the color space by setting the second achromatic color determination range as the achromatic color determination range.

According to an embodiment, the controller 120 may select a shading estimation coefficient for correcting an image by applying a plurality of shading estimation coefficients to the image, and remember an achromatic color determination range for each shading estimation coefficient, and set an achromatic color determination range corresponding to the selected shading estimation coefficient.

In operation 103, the controller 120 of the image obtaining device 100 may calculate a white balance gain based on a pixel value of a pixel having color coordinates included in the determined achromatic color determination range (operation S103).

According to an embodiment, the controller 120 may divide an image into a plurality of blocks and calculate a block statistical value of a pixel value of each of the blocks. A shading estimation coefficient may have a coefficient value corresponding to each of the blocks. The controller 120 may select a shading estimation coefficient for correcting the image by multiplying the block statistical value and the coefficient value, calculate color coordinates of the blocks, and calculate the white balance gain based on the block statistical value of blocks having color coordinates included in the set achromatic color determination range.

In operation 104, the controller 120 may correct white balance of the image by using the calculated white balance gain (operation S104).

Next, a configuration of the image processing device according to the present embodiment will be described based on a configuration of the digital still camera 300, which is an example of an image processing device.

Figure 3:
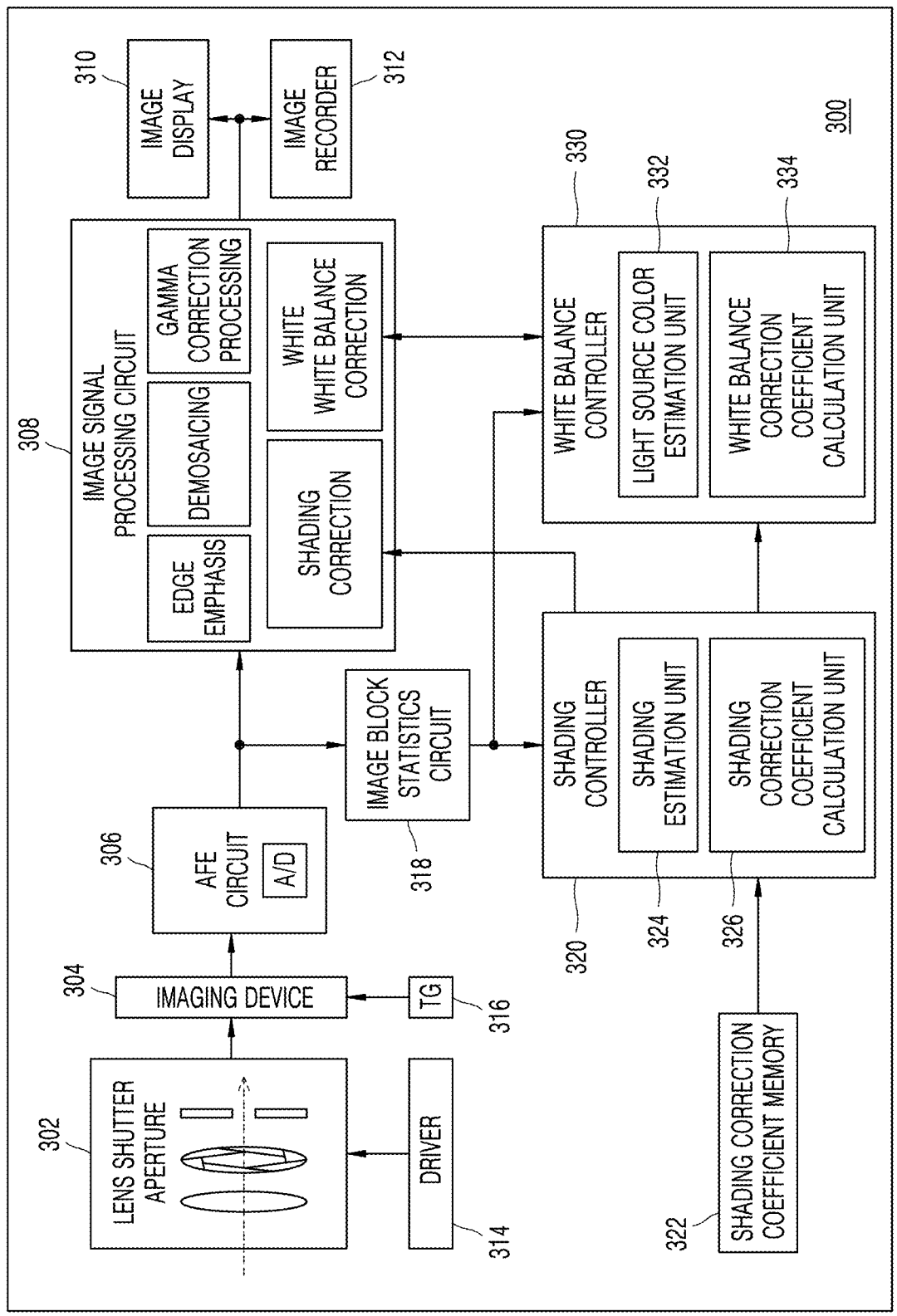
FIG. 3 is a structural block diagram of a digital still camera 300 according to an embodiment.

FIG. 3 is a structural block diagram of a digital still camera 300 according to the present embodiment.

The digital still camera 300 which is an electronic imaging device may include a lens optical system 302, an imaging device 304, an AFE circuit 306, an image signal processing circuit 308, an image display 310, an image recorder 312, a driver 314, a timing generator TG 316, an image block statistics circuit 318, a shading controller 320, a shading correction coefficient memory 322, a white balance controller 330, or the like.

The lens optical system 302 may include a lens, an aperture, a shutter, or the like, and may form a subject image on an imaging surface of the imaging device 304. The imaging device 304 is an image sensor such as a CCD or a CMOS, and an infrared cut filter (not shown) may be mounted at the lens optical system 302 of the imaging device 304. The imaging device 304 may acquire an image signal (RGB color signal) by photoelectrically converting the subject image. The AFE circuit 306 may convert an image signal, which is acquired by the imaging device 304 and subjected to signal processing by a CDS circuit (not shown), into a digital signal by A/D conversion.

The image signal processing circuit 308 may perform demosaicing processing, edge emphasis processing, shading correction processing, white balance (WB) correction processing, gamma correction processing, and the like on an image signal output by the AFE circuit 306. The image display 310 is, for example, a liquid crystal display (LCD), and may display an image signal subjected to various processes in the image signal processing circuit 308. The image recorder 312 is a memory and may record an image signal subjected to various processes in the image signal processing circuit 308.

The driver 314 may drive the lens, the aperture, and the shutter of the lens optical system 302. The timing generator 316 may generate a timing for driving the imaging device 304.

The image block statistics circuit 318 may divide a captured image area of an image signal that is converted into a digital signal in the AFE circuit 306 or a portion of the captured image area, into a grid shape to form a plurality of blocks, and may calculate a block statistical value of each block. The image block statistics circuit 318 may calculate a pixel integrated value for each of RGB pixels of each block or a pixel average value of the RGB pixels, as a block statistical value.

Further, the image block statistics circuit 318 may calculate a subject brightness, that is, an average brightness of the captured image area. As a method of calculating an average brightness, for example, the method described in Patent Document 1 may be employed.

The shading controller 320 may include a shading estimation unit 324, a shading correction coefficient calculation unit 326, or the like. The shading estimation unit 324 may estimate a shading intensity based on a block statistical value calculated by the image block statistics circuit 318 and a shading estimation coefficient stored in the shading correction coefficient memory 322, and select a shading estimation coefficient suitable for an image. The shading correction coefficient memory 322 may be provided with a shading estimation coefficient for each light source and for each of R, G, and B values. The shading estimation coefficient may have a coefficient value for each block.

The shading estimation coefficient may be calculated using an image of a white chart imaged under each light source. It is preferable to use, as the white chart, a standard white reflector that has 90% or more of constant spectral reflectance over an entire target wavelength range. A shading estimation coefficient for strongly correcting an R signal in the periphery of the image may be calculated with respect to a light source such as a bulb having a large amount of infrared light. A shading estimation coefficient that weakly corrects an R signal in a peripheral portion of the image may be calculated with respect to a light source such as a fluorescent lamp having not much infrared light.

In addition, the shading estimation unit 324 may calculate reliability of shading estimation. The shading estimation unit 324 may then output the selected shading estimation coefficient and the calculated reliability of shading estimation to the white balance controller 330.

The shading correction coefficient calculation unit 326 may select a shading correction coefficient corresponding to the shading estimation coefficient selected by the shading estimation unit 324 from the shading correction coefficient memory 322, and correct shading of a captured image by the image signal processing circuit 308. The shading correction coefficient memory 322 may be provided with a shading correction coefficient for each light source and for each of R, G, and B values. The shading correction coefficient may have a coefficient value for each pixel or for each of a plurality of pixels.

The shading correction coefficient memory 322 may store a set of a shading estimation coefficient and a shading correction coefficient according to each light source such as solar light, bulb, and fluorescent lamp. In most cases, a shading correction coefficient and the shading estimation coefficient are grouped in a set on a one-to-one basis, but are not limited thereto. A shading estimation coefficient and a shading correction coefficient may be calculated from an external device such as a PC. The shading correction coefficient may have the same value as the shading estimation coefficient or different from the shading estimation coefficient.

The white balance controller 330 may include a light source color estimation unit 332, a white balance correction coefficient calculation unit 334 or the like.

The light source color estimation unit 332 may estimate a light source or a light source color illuminating a subject of a captured image based on a shading estimation result, and may select and set an achromatic color determination range defining a range of color coordinates in a color space. In detail, the light source color estimation unit 332 may store shading estimation coefficients and light sources (light source colors) and an achromatic color determination range by matching them to one another, and may select an achromatic color determination range corresponding to a shading estimation coefficient selected by the shading estimation unit 324.

Accordingly, the light source estimation unit 332 may include an achromatic color determination range memory (not shown) for storing an achromatic color determination range.

The white balance correction coefficient calculation unit 334 may convert a block statistical value calculated using the image block statistics circuit 318, into color coordinates in the above-described color space.

In addition, the white balance correction coefficient calculation unit 334 may determine whether a block statistical value is included in the achromatic color determination range selected by the light source color estimation unit 332, and calculate a white balance gain by using a block included in the achromatic color determination range, that is, a block statistical value of the block determined to be in achromatic color.

In addition, each of elements implemented by the shading controller 320 and the white balance controller 330 may be implemented by executing a program according to the control of an arithmetic device (not shown) included in the shading controller 320 and the white balance controller 330, which is, for example, a computer.

In detail, the shading controller 320 and the white balance controller 330 may load a program stored in a memory (not shown) to a main memory (not shown), and implement the program by executing the program according to the control of an arithmetic device. In addition, the respective elements are not limited to being implemented by software by a program, but may also be implemented by combinations of hardware, firmware, and software.

The above-described program may be stored by using various types of non-transitory computer readable medium and provided to a computer. The non-transitory computer readable medium may include a tangible storage medium.

Examples of the non-transitory computer readable medium include magnetic recording media (e.g., flexible disks, magnetic tapes, hard disk drives), magneto-optical media (e.g. magneto-optical disks), CD-R, CD-R/W, a semiconductor memory (e.g., a mask ROM, a programmable ROM (PROM), an erasable PROM (EPROM), a flash ROM, a random access memory (RAM).

In addition, the program may be supplied to the shading controller 320 and the white balance controller 330 by using various types of transitory computer readable medium. Examples of the transitory computer readable medium include an electrical signal, an optical signal, and an electromagnetic wave. A transitory computer readable medium may supply a program to a computer through a wired communication channel such as an electric wire and an optical fiber, or through a wireless communication channel.

Next, an operation of the digital still camera 300 according to the present embodiment, that is, an image processing method, will be described.

First, the outline of light source estimation processing of the digital still camera 300 according to the present embodiment may be described.

Figure 4:
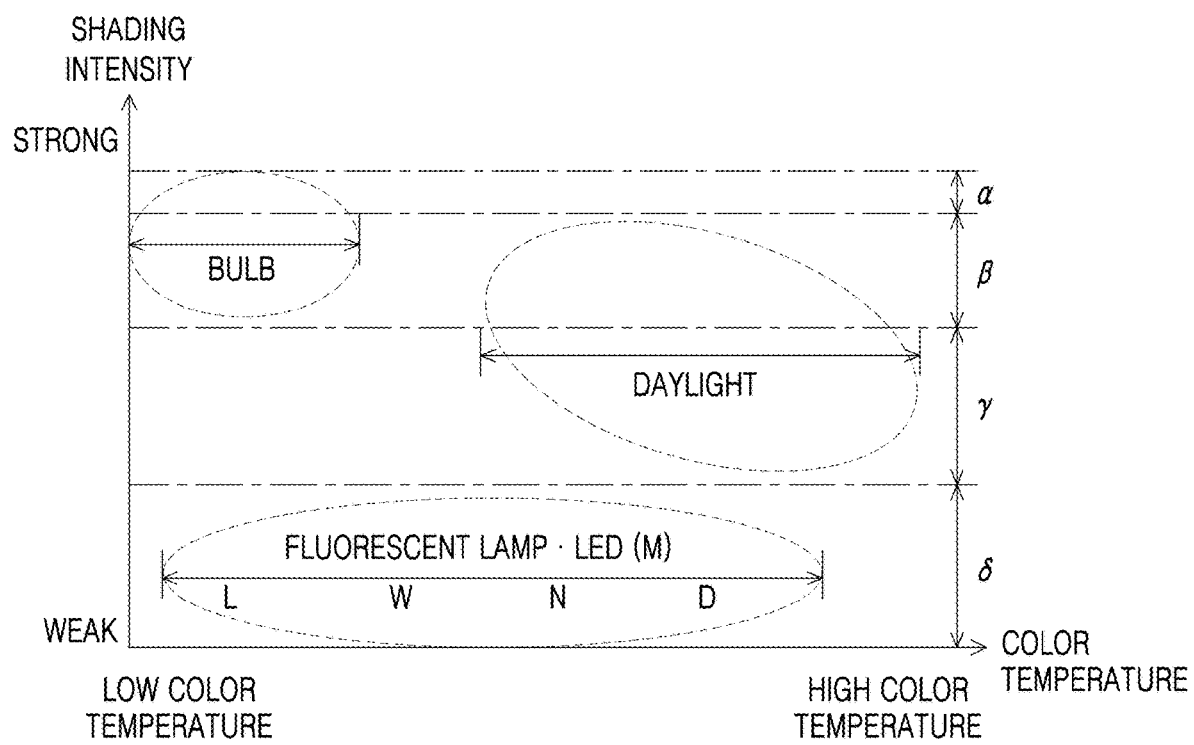
FIG. 4 is a view for describing a color temperature and a shading intensity of representative light sources.

FIG. 4 is a view for describing a color temperature and a shading intensity of representative light sources. A horizontal axis denotes color temperature, and a vertical axis denotes shading intensity.

Regarding color temperatures, a bulb has a low color temperature, and daylight has a high color temperature. However, a fluorescent lamp, LED has a wide range of color temperatures such as a bulb color (L), a white color (L), a natural white color (N, D). Accordingly, different light sources may have the same color temperature, and thus, it is difficult to estimate a light source based on a color temperature.

On the other hand, regarding shading intensity, shading strongly occurs in an image under a light source such as a bulb or daylight containing a large ratio of near infrared rays. In addition, shading occurs weakly in a captured image of a light source such as a fluorescent lamp or a LED which hardly contains near infrared light in order to increase a light emission efficiency. Thus, light sources may be estimated such that a light source under which an image has a shading intensity in a section α shown in FIG. 4 is a bulb; a light source under which an image has a shading intensity in a section β is a bulb or daylight; a light source under which an image has a shading intensity in a section γ is a daylight lamp; and a light source under which an image has a shading intensity in a section δ is a fluorescent lamp or LED.

In the light source estimation processing according to the present embodiment, a light source may be estimated based on a shading intensity of a captured image in the above-described manner.

In addition, some of captured images may not follow the above matching relationship between a shading intensity and a light source. For example, if there are a plurality of light sources such as a bulb and a fluorescent lamp, or a subject is a blue sky or a red object under daylight, the above-described matching relationship rarely applies to captured images.

Figure 5:
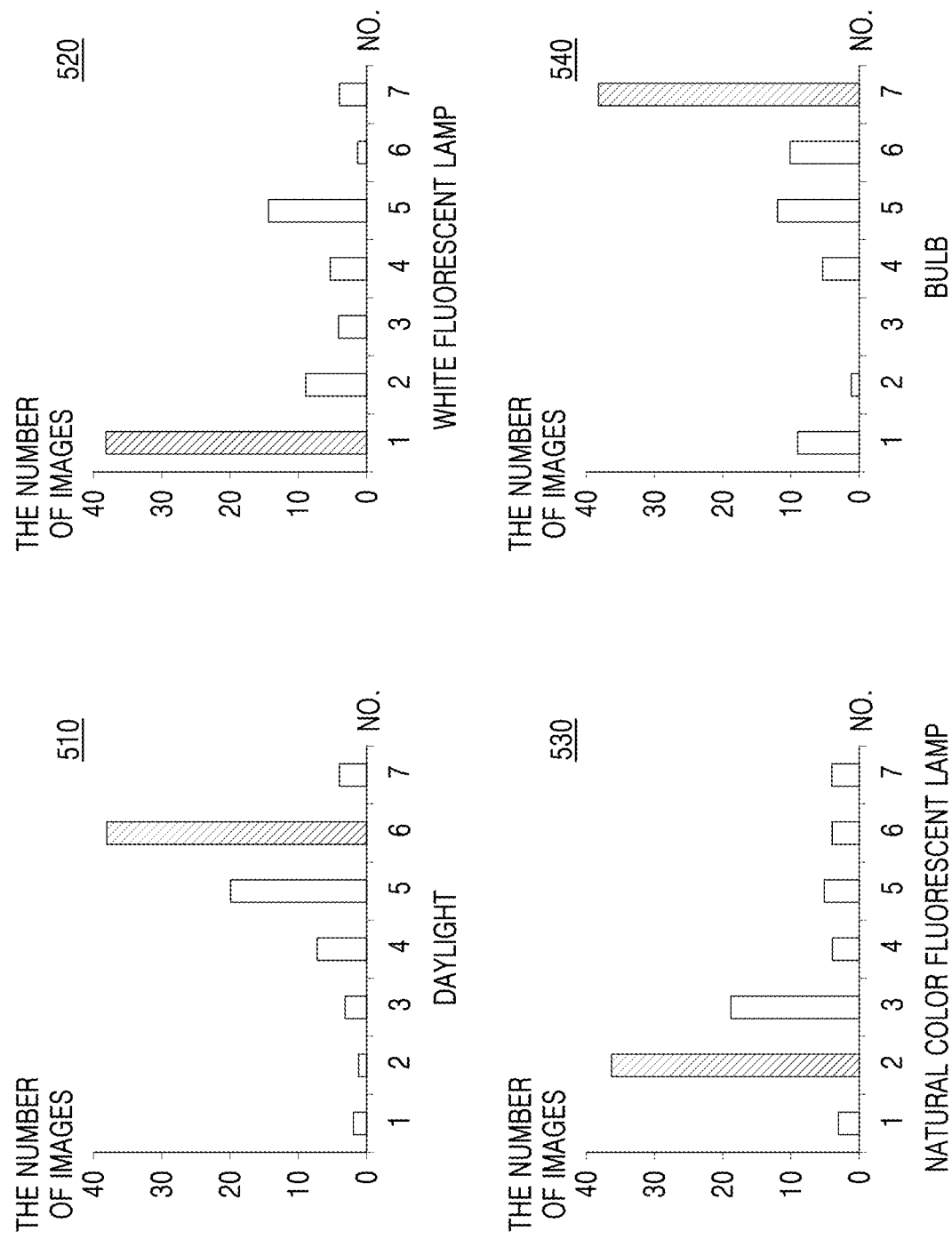
FIG. 5 illustrates results of shading estimation of images obtained by capturing images of natural image pictures as a subject under various light sources.

FIG. 5 illustrates results of shading estimation of images obtained by capturing images of pictures of natural images as a subject under various light sources. The results are results of estimation of shading with respect to images obtained by capturing images of 75 natural images as a subject in various color arrangements under four types of light sources (daylight, white light fluorescent lamp, natural color fluorescent lamp, and bulb). A horizontal axis denotes a type of a shading estimation coefficient (the number of a shading estimation coefficient), and a vertical axis denotes the number of sheets of images, for which a shading estimation coefficient of a corresponding number as a result of estimating shading.

For example, referring to 510 of FIG. 5, when a light source is daylight, a shading estimation coefficient of number 6 may be selected for images of nearly forty sheets as the shading estimation coefficient of number 6 is determined to be suitable to correct shading of the images. Here, as a number of a shading estimation coefficient increases, shading of images in which shading remarkably occurs (an image with a high shading intensity) may be corrected more strongly.

In addition, hatching is applied to bars corresponding to estimation results (number of shading estimation coefficient) of estimating shading of an image obtained by capturing an image of a white plate as a subject under each light source. For example, referring to 520 of FIG. 5, regarding an image obtained by capturing an image of a white plate under a white fluorescent lamp, a shading estimation coefficient of number 1 is the most suitable to correct shading, and thus, a bar of the shading estimation coefficient of number 1 is hatched.

Likewise, referring to 530 of FIG. 5, when a light source is a natural color fluorescent lamp, a shading estimation coefficient of number 2 is most suitable to correct shading of the image, and thus, a bar of the estimation coefficient of number 2 is hatched. Finally, referring to 540 of FIG. 5, a shading estimation coefficient of number 7 is most suitable to correct shading of an image obtained by capturing an image of a white plate under a bulb, and thus, a bar of the shading estimation coefficient of number 7 is hatched.

Characteristics of shading also vary according to a color of a subject as well as a light source, and thus, in the case of any light source, about half of shading estimation results of images obtained by capturing images of natural image pictures are consistent with a shading estimation result of an image obtained by capturing an image of a white plate.

Accordingly, by using consistency between shading estimation results and those shading estimation results of images obtained by capturing an image of a white plate as reliability of the shading estimation results, a light source may be estimated more properly.

In general, a shading estimation result of an image in which a subject of an identical color distribution exists over a large area and a shading estimation result of an image obtained by capturing an image of a white plate correspond to each other.

Accordingly, according to the image processing method of the present embodiment, whether a captured image is an image in which a subject of an identical color distribution exists over a large area is determined by calculating a block weight Bw, and used as reliability of a shading estimation result. As described above, calculation of reliability of shading estimation results may be performed using the shading estimation unit 324.

The shading estimation unit 324 may calculate an average gain by using a result of multiplying a block statistical value of an image of an object, white balance of which is to be corrected, and a coefficient value of a shading estimation coefficient for correcting shading most weakly (hereinafter referred to as 'shading estimation initial coefficient'), calculate a block color evaluation value Hb by using the average gain, and calculate a block weight Bw based on the block color evaluation value Hb and a level G weight.

Figure 6:
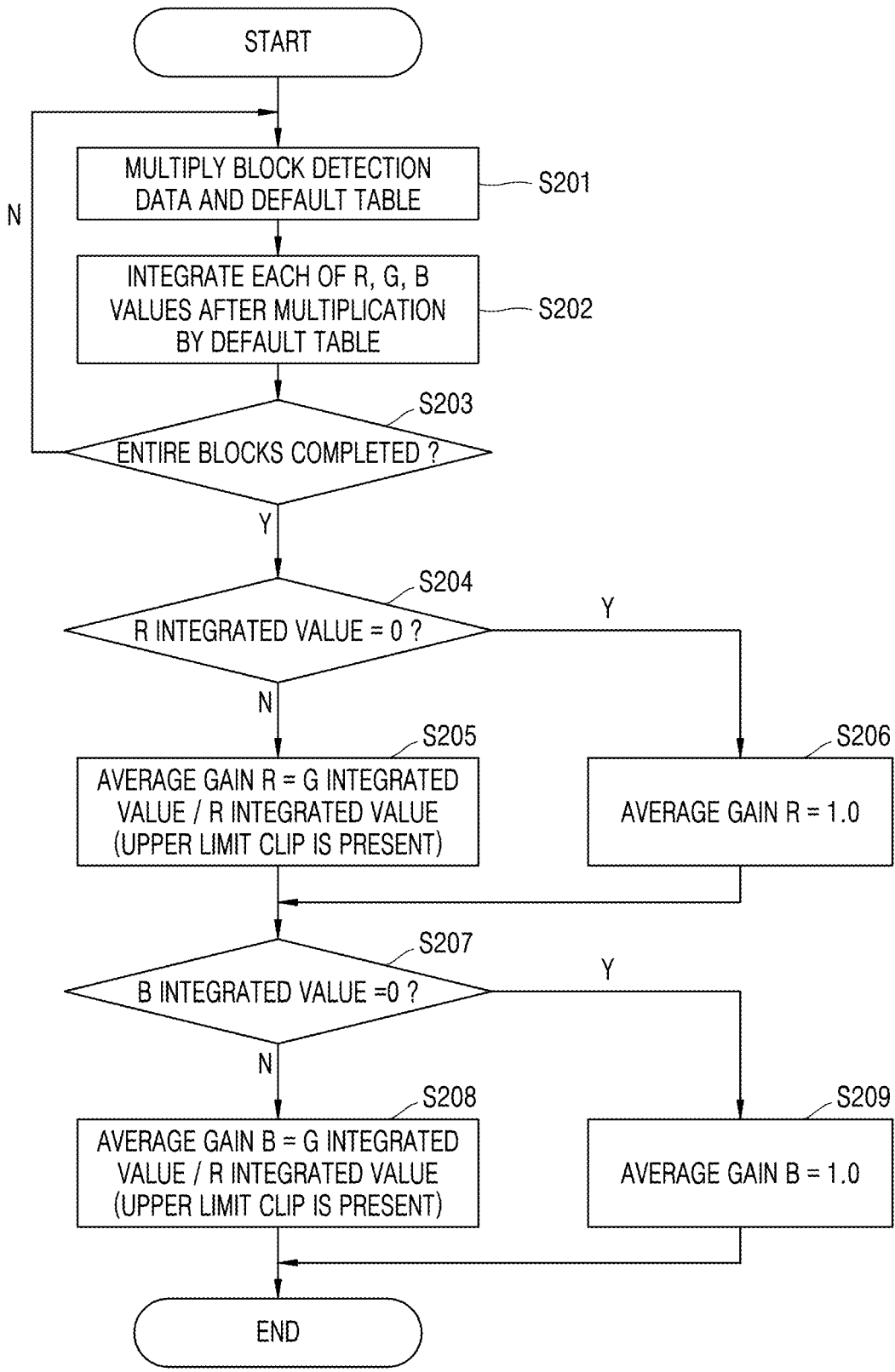
FIG. 6 is a flowchart of a processing order of an average gain calculation method according to an embodiment.

FIG. 6 is a flowchart of a processing order of an average gain calculation method according to an embodiment.

In order to normalize R, G, and B values of a block to be evaluated, the shading estimation unit 324 may reduce shading of an object image by multiplying a block statistical value before shading correction is applied, and a coefficient value of a shading estimation initial coefficient, and may calculate an average gain.

That is, block detection data may be multiplied by a shading estimation initial coefficient (operation S201). When block statistical values are Ri, Gi, and Bi, and coefficient values of shading estimation initial coefficients are Nr, Ng, and Nb, block statistical values (Rn(N, M), Gn(N, M), Bn(N, M)) after multiplying by the shading estimation initial coefficients are expressed by Formula (1).

[Formula 1]

$$\left.\begin{array}{l} Rn(N, M) = Ri(N, M) \cdot Nr(N, M) \\ Gn(N, M) = Gi(N, M) \cdot Ng(N, M) \\ Bn(N, M) = Bi(N, M) \cdot Nb(N, M) \end{array}\right\} \quad (1)$$

Next, the block statistical values (Rn(N, M), Gn(N, M), Bn(N, M)) after the multiplication by the shading estimation initial coefficient may be added up according to the number of the entire blocks (operations S202, S230), and an average gain may be calculated from the ratio of the block statistical values. Here, an average gain of a pixel G may be set as 1.0, and then average gains of a pixel R and a pixel B may be calculated.

In detail, the average gains may be calculated by using formula (2).

[Formula 2]

$$TempGainR = \frac{\Sigma Gn(N, M)}{\Sigma Rn(N, M)} \quad TempGainB = \frac{\Sigma Gn(N, M)}{\Sigma Bn(N, M)} \quad (2)$$

$$AverageGainR = \begin{cases} \text{if } \Sigma Rn(N, M) = 0 \\ 1.0 \\ \text{if } TempGainR \leq AverageGainLimitR \\ TempGainR \\ \text{if } TempGainR > AverageGainLimitR \\ AverageGainLimitR \end{cases}$$

$$AverageGainB = \begin{cases} \text{if } \Sigma Bn(N, M) = 0 \\ 1.0 \\ \text{if } TempGainB \leq AverageGainLimitB \\ TempGainB \\ \text{if } TempGainB > AverageGainLimitB \\ AverageGainLimitB \end{cases}$$

That is, whether an integrated value of Rn(N, M) or Bn(N, M) is 0 is determined (operation S204, S207), and if it is 0, an average gain of a pixel R or a pixel B (Average Gain R/Average Gain B) may be set as 1.0 (operation S260, S209). Meanwhile, if the integrated value of Rn(N, M) or Bn(N, M) is not 0, an average gain of pixel R may be set to a G integrated value/a R integrated value or an average gain of pixel B=a G integrated value/B integrated value (operation S205, S208). In addition, in order to prevent overflow, an average gain of pixel R or pixel B may be clipped on an upper limit by an average gain upper limit value (Average Gain Limit)(R, B) (may be set to an upper limit).

Figure 7:
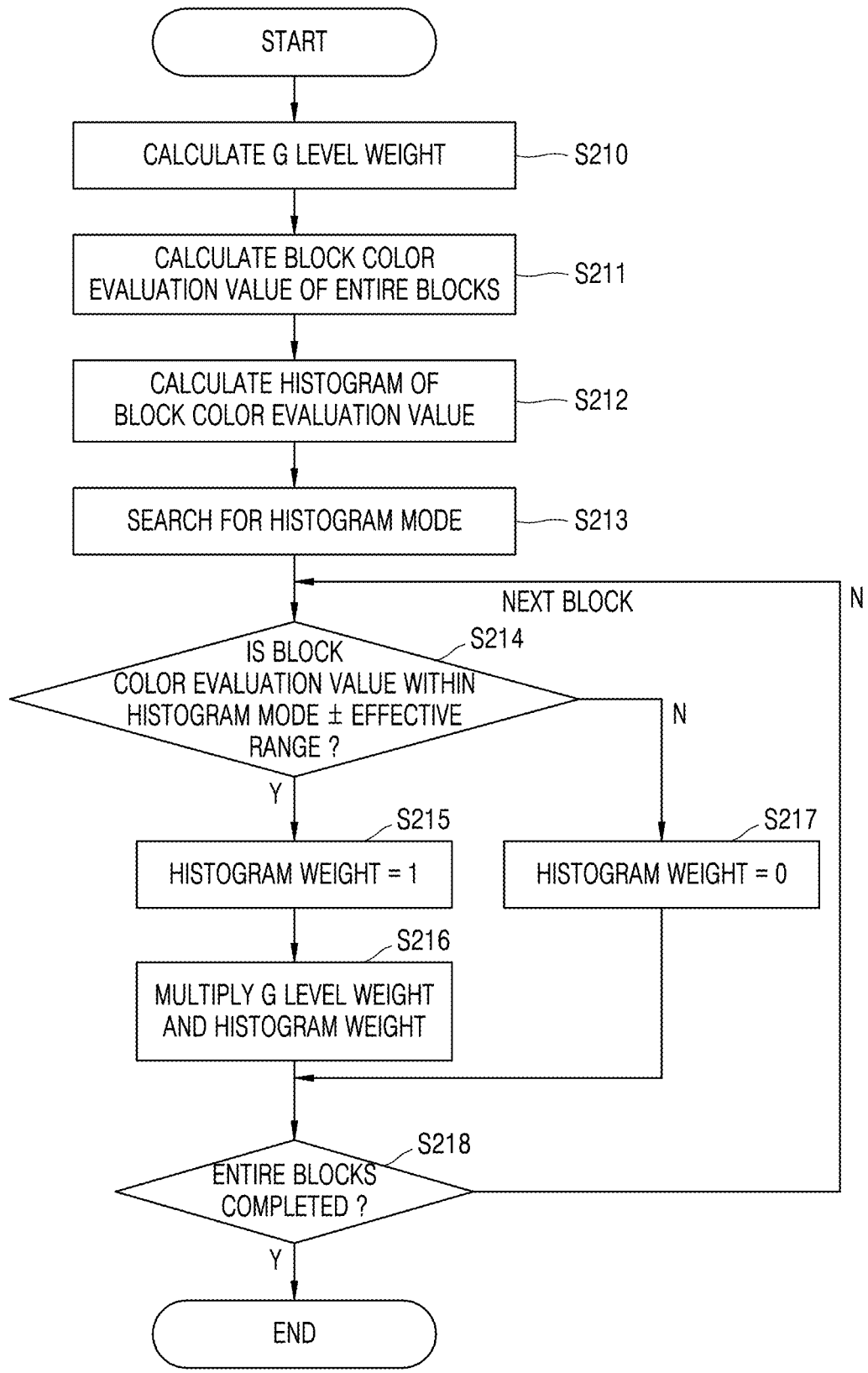
FIG. 7 is a flowchart of a method of calculating a block weight Bw according to an embodiment.

FIG. 7 is a flowchart of a method of calculating a block weight Bw according to an embodiment.

Following the operation illustrated in FIG. 6, the shading estimation unit 324 may calculate a G level weight in order to exclude blocks near a dark portion or near a saturation range from an evaluation list (operation S210).

Figure 8:
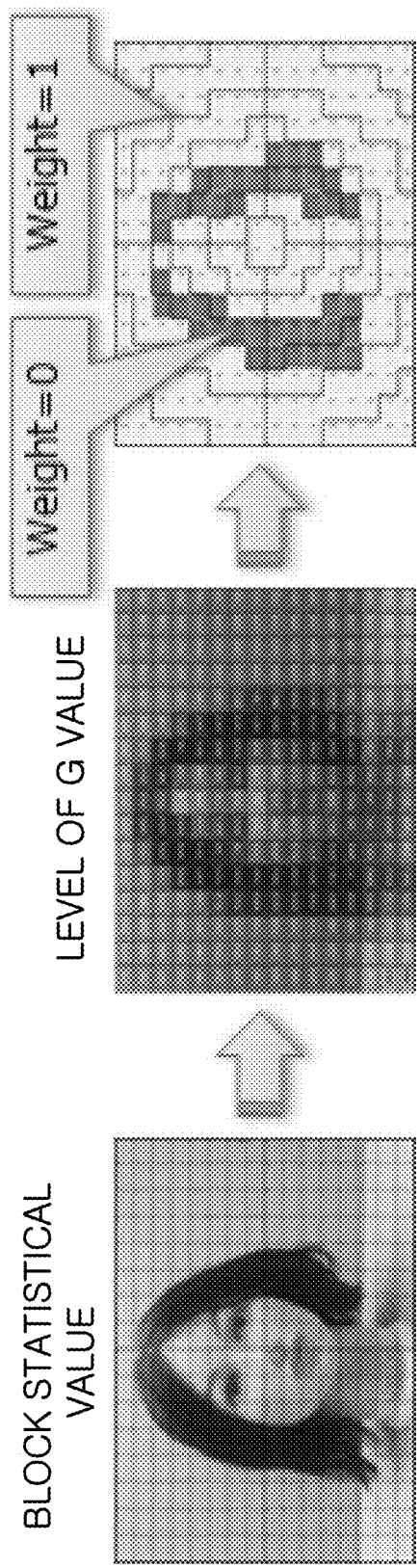
FIG. 8 is a view for describing a G level weight according to an embodiment.

FIG. 8 is a view for describing a G level weight according to an embodiment.

Regarding G level weights, a G level weight of blocks between an upper limit threshold and a lower limit threshold that are previously set by referring to a level of a G value of the block statistical values obtained by multiplying block data and shading estimation coefficients may be set to 1.0, and blocks outside the range of the threshold may be set to 0.0. In addition, blocks including any one of a R pixel value, a G pixel value, and a B pixel value is outside a previously set range may be excluded from a list of blocks to be evaluated.

Next, a block color evaluation value Hb of the entire blocks may be calculated (operation S211). As expressed in the formula (3), by multiplying the block statistical values (Gn(N, M), Bn(N, M)) obtained by multiplying the shading estimation initial coefficients calculated by the formulas (1) and (2) and an average gain, block color evaluation values Hb(N, M) may be calculated.

[Formula 3]

$$\left.\begin{array}{l} Gng(N, M) = Gn(N, M) \cdot 1.0 \\ Bng(N, M) = Bn(N, M) \cdot AverageGainB \\ Hb(N, M) = Bng(N, M)/Gng(N, M) \end{array}\right\} \quad (3)$$

Next, a histogram of the block color evaluation value Hb may be generated (operation S212), and a histogram weight may be calculated in order to exclude blocks that are away from a mode value (operations S213 through S215 and S217).

Figure 9:
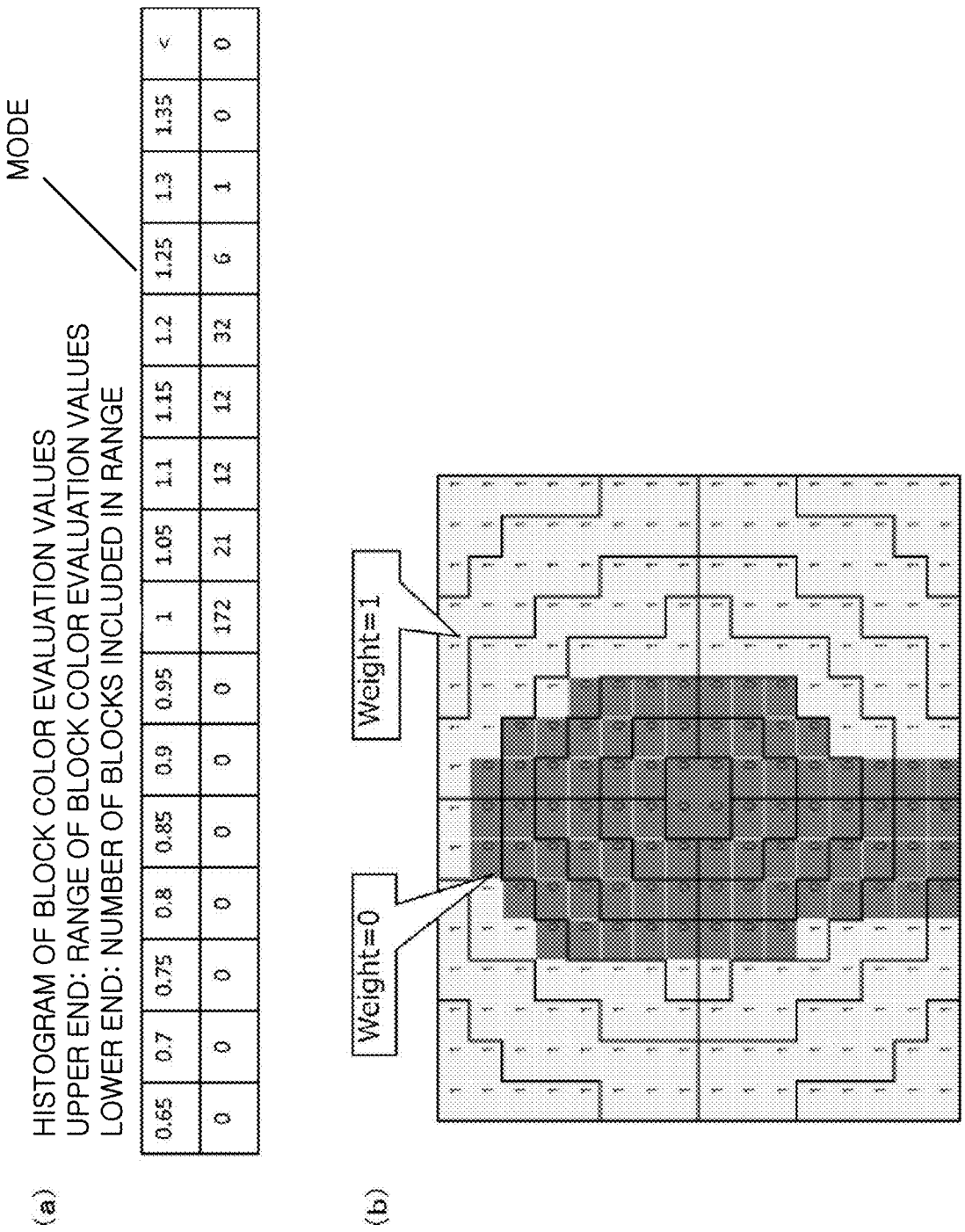
FIG. 9 is a view for describing a histogram of block color evaluation values Hb and histogram weights according to an embodiment.

FIG. 9 is a view for describing a histogram of a block color evaluation value Hb and histogram weights according to the present embodiment. The histogram corresponds to the block color evaluation value Hb ranging between 0.65 and 1.35, which is divided by intervals of 0.05.

In detail, the mode of the histogram is searched (operation S213), and whether a block color evaluation value Hb of each block is within an effective range from the mode of the histogram is determined (operation S214), and if the mode is within the effective range as illustrated in FIG. 9, the histogram weight may be set to 1 (operation S215), and if the mode is outside the effective range, the histogram weight may be set to 0 (operation S217). The block, for which the histogram weight is set to 1, may be selected as a block to be evaluated.

Next, the G level weight and the histogram weight may be multiplied to generate a block weight Bw (operation S216).

Figure 10:
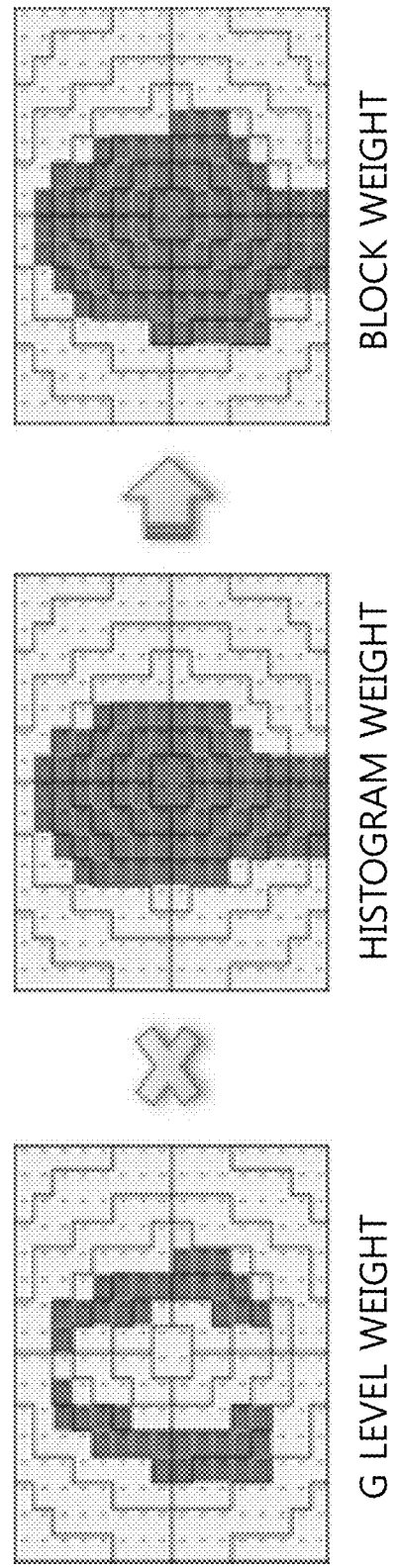
FIG. 10 is a view for describing a block weight Bw according to an embodiment.

FIG. 10 is a view for describing a block weight Bw according to an embodiment. A block weight Bw of blocks around an image may be 1.

By repeating the processings (operations S214 through S218), block weights Bw of the entire blocks may be calculated.

In addition, a ratio of blocks, for which a block weight Bw is set to 1 with respect to the number of the entire blocks of a captured image, may be calculated. The higher this ratio, the more accurately may the captured image be determined as an image in which a subject of an identical color distribution exists over a large area, and this ratio may be used as reliability of a shading estimation result and compared with a threshold to determine a degree of reliability of the shading estimation result.

In addition, whether a captured image is an image in which a subject of a color distribution exists over a large area may also be determined using another method. For example, it may be determined by using a distribution degree of all block statistical values.

That is, whether a captured image is an image in which a subject of an identical color distribution exists over a large area may also be determined based on flatness of the captured image such as a ratio of blocks, for which a block weight Bw is set to 1, a degree of distribution of all block statistical values, or the like.

According to the light source estimation processing according to the present embodiment, a probability of a shading estimation result may be calculated and a probability of light source estimation may be calculated as described above.

Next, white balance gain calculation processing of the digital still camera 300 according to the present embodiment will be described.

Figure 11:
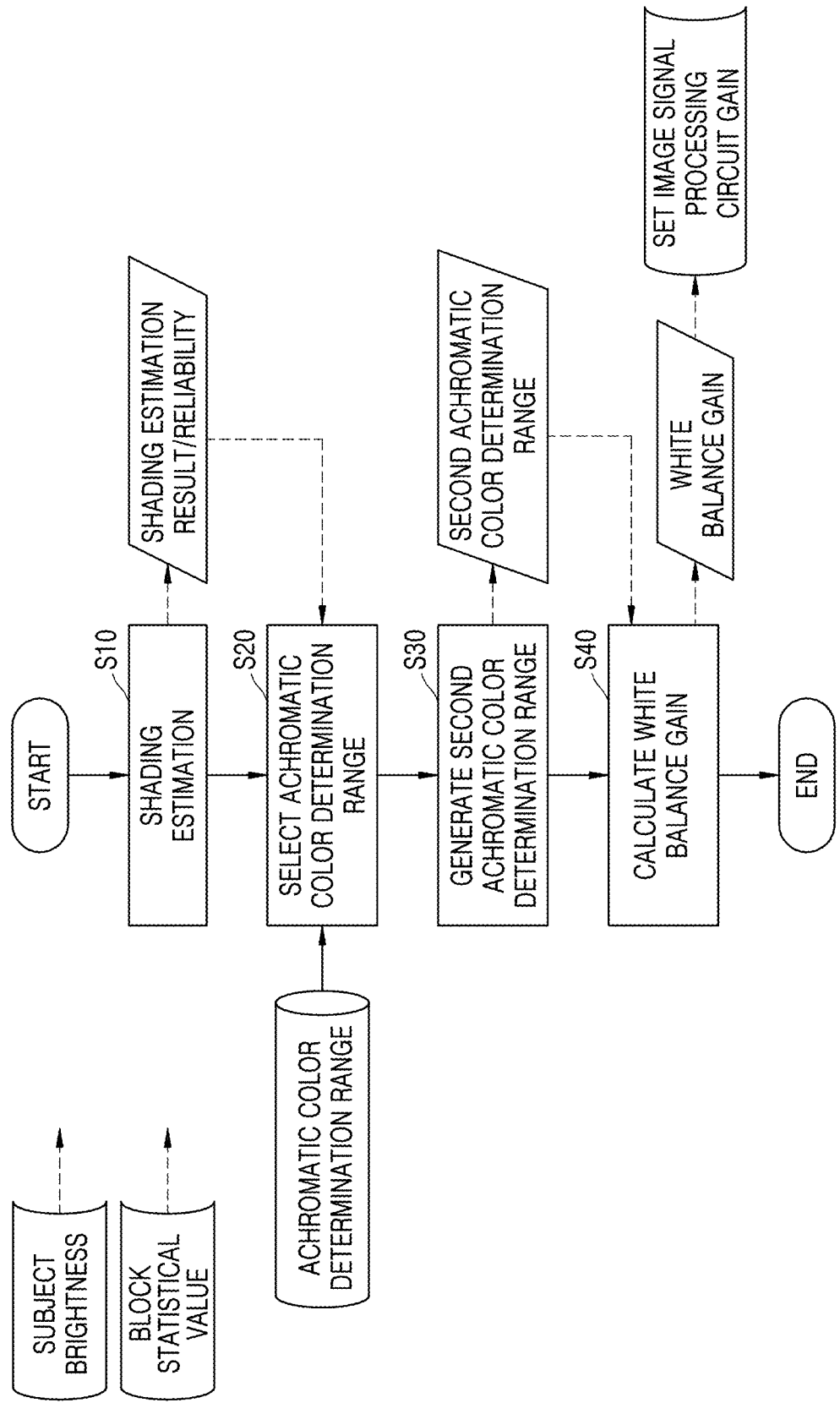
FIG. 11 is a flowchart of a processing order of an image processing method according to an embodiment.

FIG. 11 is a flowchart of a processing order of an image processing method according to an embodiment.

When the digital still camera 300 captures an image of a subject, the image block statistics circuit 318 may calculate a subject brightness, a block statistical value or the like of the captured image as described above.

In addition, the shading estimation unit 324 may estimate shading of the captured image by using a block statistical value, a shading estimation coefficient or the like (operation S10). Regarding this shading estimation processing, a processing method that is disclosed in, for example, Patent document 2, JP 2013-198041, may be used, and detailed description thereof may be omitted here. The shading estimation unit 324 may output a shading estimation coefficient suitable for the captured image, reliability of the shading estimation result or the like as a result of shading estimation.

Next, the light source color estimation unit 332 may estimate a light source based on a subject brightness, a shading estimation result or the like, and select and set an achromatic color determination range (operation S20).

FIG. 12 is a view for describing a light source estimation method according to the present embodiment. The light source color estimation unit 332 previously stores a table indicating a relationship between subject brightness and the number of shading estimation coefficients and estimated light sources as illustrated in FIG. 12. The mark in the table denotes a choice regarding low reliability of shading estimation. The greater the number of the shading estimation coefficient, the more strongly may shading of an image corrected according to an image with a high shading intensity be.

Figure 13:
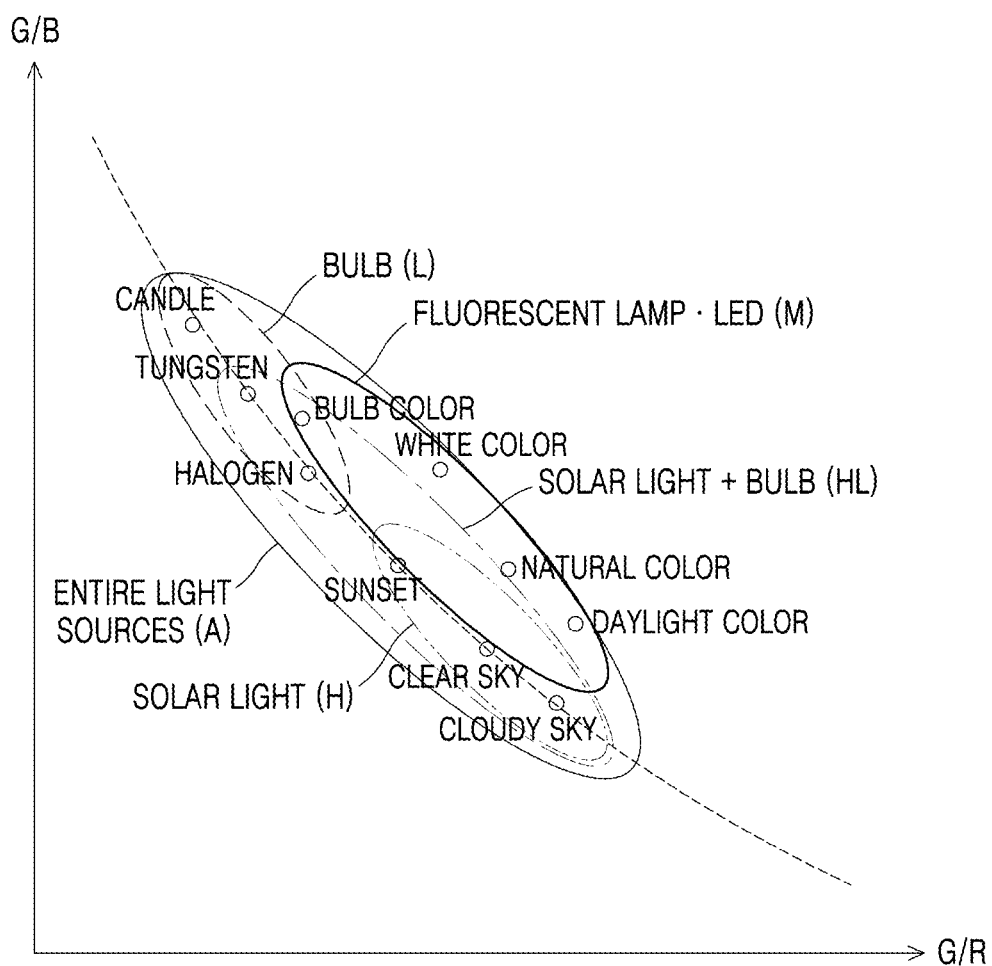
FIG. 13 illustrates an achromatic color determination range of each of estimated light sources according to an embodiment.

FIG. 13 illustrates an achromatic color determination range of each of estimated light sources according to the present embodiment. A range of color coordinates of an achromatic color determination range for each of estimated light sources set to be in a G/R-G/B color space is illustrated.

The light source color estimation unit 332 may estimate a light source by referring to the table illustrated in FIG. 12 and select an achromatic color determination range illustrated in FIG. 13.

For example, when a subject brightness is low brightness, and a shading estimation coefficient selected as a result of shading estimation is number 5, and reliability of shading estimation is high, the light source color estimation unit 332 may estimate the light source to be solar light+bulb (HL), and select an achromatic color determination range corresponding to solar light_bulb (HL).

Also, when a subject brightness is low brightness, and a shading estimation coefficient selected as a result of shading estimation is number 5, and reliability of shading estimation is low, the light source color estimation unit 332 may estimate the light source to be the entire light source (A) regardless of the shading estimation result, and select an achromatic color determination range corresponding to the total light source (A).

Also, when a subject brightness is middle brightness, and a shading estimation coefficient selected as a result of shading estimation is number 5, and reliability of shading estimation is high, the light source color estimation unit 332 may estimate the light source to be solar light+bulb (HL) or solar light (H), and select two achromatic color determination ranges respectively corresponding to solar light+bulb (HL) and to solar light (H).

Also, when a subject brightness is high brightness, regardless of a shading estimation result or reliability of shading estimation, the light source color estimation unit 332 may estimate the light source to be solar light (H), and select an achromatic color determination range corresponding to solar light (H).

Also, the subject brightness may be determined as low brightness, middle brightness, and high brightness based on a brightness value BV having, for example, 4.0 and 8.0 as boundary values.

Next, when the subject brightness is middle brightness and two achromatic color ranges are selected in operation S20, the light source color estimation unit 332 may use these ranges to generate a new range (hereinafter referred to as a 'second achromatic color determination range') (operation S30).

Figure 14:
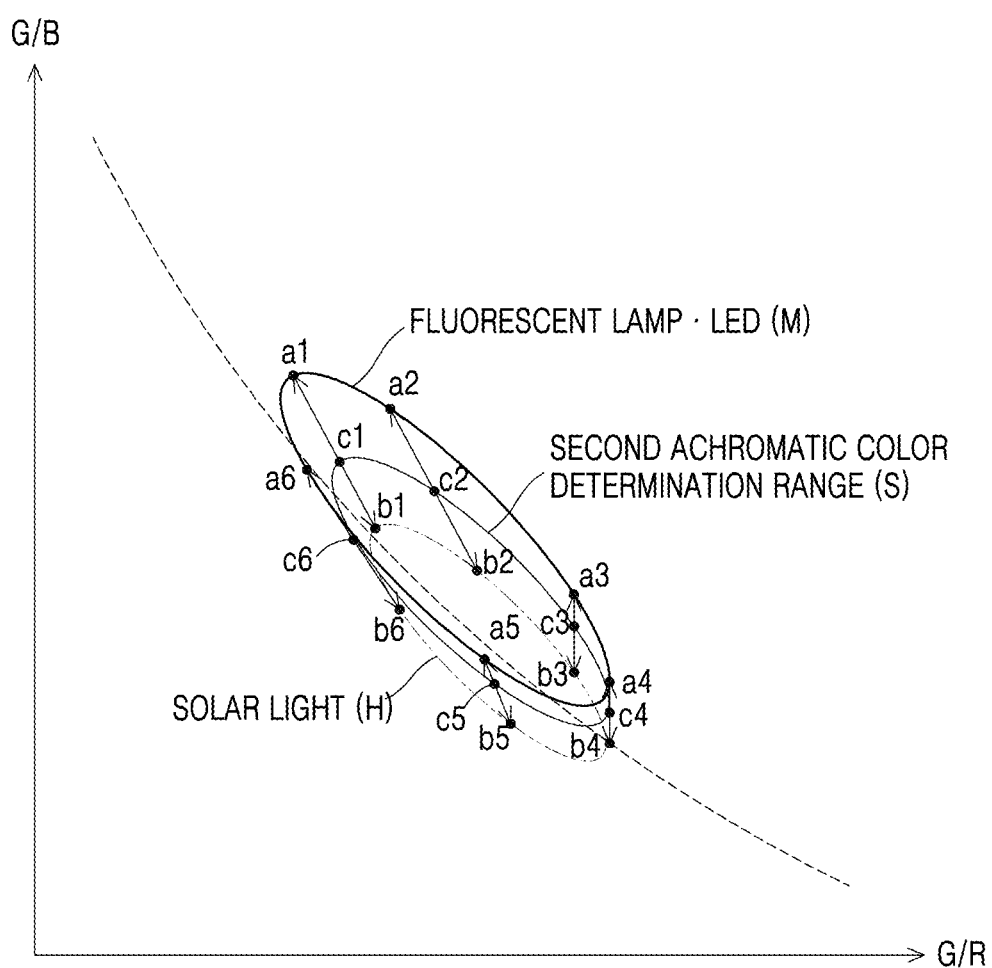
FIG. 14 is a view for describing a method of generating a second achromatic color determination range according to an embodiment.

FIG. 14 is a view for describing a method of generating a second achromatic color determination range according to the present embodiment. In operation S20, a method of generating a second achromatic color determination range (S) corresponding to fluorescent lamp, LED (M) and to solar light (H) as an achromatic color determination range corresponding is illustrated.

That is, a plurality of corresponding points a1 through a6 and points b1 through b6 are previously defined on a boundary between the two achromatic color determination ranges (M) and (H), and interpolation points c1 through c6 are generated between the corresponding points based on subject brightness (By values), and the interpolation points c1 through c6 are connected by a line to generate a second achromatic color determination range. If the subject brightness is close to low brightness, that is, if a Bv value is close to 4, an interpolation point c1 that is close to the corresponding point a1 of the achromatic color determination range (M) at low brightness may be generated; if the subject brightness is close to high brightness, that is, if a By value is close to 8, an interpolation point c1 that is close to the corresponding point b1 of the achromatic color determination range (H) at high brightness may be generated. For example, if a By value is 5, an interpolation point c1 may be generated at a position that divides a section between the corresponding point a1 and the corresponding point b1 at a ratio of 1:3.

In addition, when an achromatic color determination range is defined as an N-polygon, the processing of generating a second achromatic color determination range by connecting interpolation points by a line may be simplified.

Next, the white balance correction coefficient calculation unit 334 may calculate color coordinates of each block, and whether the color coordinates are included in the achromatic color determination range selected in operation S20 or in the second achromatic color determination range selected in operation S30 is determined, and blocks having color coordinates included in the achromatic color determination range or the second achromatic color determination range are determined to be in achromatic color, and a white balance gain may be calculated by using the achromatic color blocks (operation S40).

In the image processing method according to the present embodiment, the method of calculating a white balance gain per se may be performed by using calculation methods according to the conventional art. For example, a white balance gain may also be calculated based on a pixel average value of a block that is regarded to be in a light source color (achromatic color block).

Next, the white balance gain calculated by using the white balance correction coefficient calculation unit 334 may be input to the image signal processing circuit 308, and the image signal processing circuit 308 may perform white balance correction.

As described above, according to the image processing device or the image processing method of the present embodiment, a light source illuminating a subject is estimated based on a shading intensity of a captured image based on a difference in shading intensity of captured images according to light sources used in capturing the images, and color failure is prevented by modifying an achromatic color determination range corresponding to when calculating a white balance gain.

In addition, while a light source is estimated according to types of shading estimation coefficients and an achromatic color determination range set for each light source is selected according to the image processing device or the image processing method of the present embodiment, an achromatic color determination range may also be set according to types of shading estimation coefficients, and an achromatic color determination range may be selected according to the types of shading estimation coefficients. In other words, the operation of estimating a light source may be omitted.

In addition, while a shading intensity is estimated according to types of shading estimation coefficients according to the image processing device or the image processing method of the present embodiment, a shading intensity may also be estimated based on a ratio between a pixel value in a center portion of a captured image and a pixel value in a periphery portion of the image, or a ratio between a block statistical value in a center portion of an image and a block statistical value in a periphery portion of the image. In addition, estimated light sources or achromatic color determination ranges may be previously set for each range of the ratio of the pixel value or each range of the ratio of the block statistical value, and an achromatic color determination range may be selected based on the ratio of the measured pixel value or the ratio of the block statistical value.

In addition, while a light source is estimated and an achromatic color determination range is selected based on a subject brightness, a shading estimation result, and reliability of shading estimation according to the image processing apparatus or the image processing method according to the present embodiment, according to circumstances, for example, in order to put a processing speed first, a light source may be estimated and an achromatic color determination range may be selected by using a subject brightness and a shading estimation result without using reliability of shading estimation, or a light source may be estimated and an achromatic color determination range may be selected by using only a shading estimation result without using reliability of shading estimation. That is, types of shading estimation coefficients and estimated light sources and achromatic color determination ranges that match one another may be stored, and then a light source may be estimated and an achromatic color determination range may be selected based on the selected type of shading estimation coefficient.

Although an achromatic color determination range is set using the G/R-G/B color space according to the image processing apparatus or the image processing method according to the present embodiment, other color spaces may also be used, and an achromatic color determination range adjusted that color space may be set.

Further, according to the image processing apparatus or the image processing method according to the present embodiment, a white balance gain is calculated by calculating color coordinates of each block and determining whether the color coordinates are included in the achromatic color determination range. However, a white balance gain may also be calculated by using the pixel value, by calculating color coordinate of each pixel and determining whether the color coordinates are included in the achromatic color determination range. That is, instead of processing each operation on a block-by-block basis, they may also be processed on a pixel-by-pixel basis.

Further, in the image processing apparatus or the image processing method according to the present embodiment, when the brightness of the subject is medium brightness, two achromatic color determination ranges are selected to generate and set a second achromatic color determination range. However, a second achromatic color determination range may be generated also by selecting two or more achromatic color determination ranges or by selecting one achromatic color determination range.

As described above, the digital still camera 300 according to the present embodiment includes the shading estimation unit 324 for estimating a shading intensity of an image, the shading estimation unit 322 for previously storing an achromatic color determination range for each shading intensity, and setting an achromatic color determination range corresponding to an estimated shading intensity as a color space, the correction coefficient calculation unit 334 for calculating color coordinates of a pixel of the image and calculating a white balance gain based on a pixel value of a pixel having color coordinates included in the set achromatic color determination range, and the image signal processing circuit 308 for correcting white balance of the image by using the calculated white balance gain.

According to this configuration, the white balance may be corrected by suitably estimating a light source and preventing color failure.

In addition, the shading estimation unit 324 may preferably calculate reliability of shading estimation based on a flatness of an image, and the light source estimation unit 332 may preferably set a predetermined achromatic color determination range corresponding to when the reliability is a predetermined value or less, as a color space.

According to this configuration, a light source may be more suitably estimated to further prevent color failure based on reliability of shading estimation.

In addition, the light source color estimation unit 332 may preferably select a plurality of achromatic color determination ranges when a subject brightness of an image is within a predetermined range, and generate a second achromatic color determination range based on the plurality of achromatic color determination ranges, and set a color space by setting the second achromatic color determination range as an achromatic color determination range.

According to this configuration, a white balance gain may be calculated with higher precision by more suitably setting an achromatic color determination range by a second achromatic color determination range.

In addition, the shading estimation unit 324 may preferably select a shading estimation coefficient for suitably correcting an image by applying a plurality of shading estimation coefficients to the image, and the light source color estimation unit 332 may preferably store an achromatic color determination range for each shading estimation coefficient, and set an achromatic color determination range corresponding to the selected shading estimation coefficient.

According to this configuration, a light source may be simply and suitably estimated based on the selected shading estimation coefficient to thereby prevent color failure.

Also, the digital still camera 300 according to the present embodiment may further include the image block statistics circuit 318 for dividing an image into a plurality of blocks and calculating a block statistical value obtained by compiling statistics of pixel values of respective blocks, wherein a shading estimation coefficient has a coefficient value corresponding to each block, and the shading estimation unit 324 may preferably select a shading estimation coefficient for suitably correcting the image by multiplying the block statistical value and the coefficient value, and the correction coefficient calculation unit 334 may preferably calculate color coordinates of a block and calculate a white balance gain based on a block statistical value of a block having color coordinates included in a set achromatic color determination range.

According to this configuration, a light source may be suitably estimated and white balance may be suitably corrected while reducing a total calculation amount from shading estimation to white balance gain calculation.

In addition, the image processing method of the present embodiment includes the operation of storing an achromatic color determination range for each shading intensity, operation S10 of estimating a shading intensity of an image, operations S20, S30 of setting an achromatic color determination range corresponding to an estimated shading intensity, as a color space, operation S40 of calculating color coordinates of a pixel in the image and calculating a white balance gain based on a pixel value of a pixel having color coordinates included in a set achromatic color determination range, and operation of correcting white balance of the image by using the calculated white balance gain.

According to this configuration, a light source may be suitably estimated and color failure may be prevented to correct white balance.

What is claimed is:

1. An image obtaining device comprising:
at least one processor configured to:
    obtain an image;
    previously store an achromatic color determination range for a plurality of shading intensity;
    select a shading estimation coefficient for correcting the image by applying a plurality of shading estimation coefficients to the image;
    store an achromatic color determination range for each of the shading estimation coefficients; and
    identify an achromatic color determination range corresponding to the selected shading estimation coefficient and a shading intensity, among the plurality of shading intensities, of the obtained image, as a color space.

2. The image obtaining device of claim 1, wherein the at least one processor is further configured to calculate a white balance gain based on a pixel value of a pixel having color coordinates included in the identified achromatic color determination range, and correct white balance of the image by using the calculated white balance gain.

3. The image obtaining device of claim 2, wherein the at least one processor is further configured to calculate reliability of shading estimation based on a flatness of the image, and set a predetermined achromatic color determination range corresponding to when the reliability is a predetermined value or less, as the color space.

4. The image obtaining device of claim 2, wherein the at least one processor is further configured to, when a subject brightness of the image is within a predetermined range, select a plurality of achromatic color determination ranges, generate a second achromatic color determination range based on the plurality of achromatic color determination ranges, and set the color space by setting the second achromatic color determination range as the achromatic color determination range.

5. The image obtaining device of claim 2, wherein the at least one processor is further configured to divide the image into a plurality of blocks, and calculate a block statistical value of the pixel value for each of the blocks, and
    wherein the shading estimation coefficient has a coefficient value corresponding to each of the blocks, and
    wherein the at least one processor is further configured to select a shading estimation coefficient for correcting the image by multiplying the block statistical value and the coefficient value, calculate color coordinates of the blocks, and calculate the white balance gain based on the block statistical value of a block having color coordinates included in the identified achromatic color determination range.

6. An image obtaining method, comprising:
obtaining an image;
previously storing an achromatic color determination range of a plurality of shading intensities;
select a shading estimation coefficient for correcting the image by applying a plurality of shading estimation coefficients to the image;
storing an achromatic color determination range for each of the shading estimation coefficients; and
identifying an achromatic color determination range corresponding to the selected shading estimation coefficient and a shading intensity, among the plurality of shading intensities, of the obtained image, as a color space.

7. The image obtaining method of claim 6, further comprising:
calculating a white balance gain based on a pixel value of a pixel having color coordinates included in the identified achromatic color determination range; and
correcting white balance of the image by using the calculated white balance gain.

8. The image obtaining method of claim 7, further comprising calculating reliability of shading estimation based on flatness of the image, wherein a setting of the achromatic color determination range as a color space comprises setting a predetermined achromatic color determination range at a reliability or less as the color space.

9. The image obtaining method of claim 7, further comprising:

selecting a plurality of achromatic color determination ranges when a subject brightness of the image is within a predetermined range, and generating a second achromatic color determination range based on the plurality of achromatic color determination ranges; and setting the color space by setting the second achromatic color determination range as the achromatic color determination range.

10. The image obtaining method of claim 7, further comprising:

dividing the image into a plurality of blocks and calculating a block statistical value of each of the blocks, wherein the shading estimation coefficients respectively have coefficient values respectively corresponding to the blocks, selecting a shading estimation coefficient for correcting the image by multiplying the block statistical value and the coefficient value, wherein the calculating of the white balance gain comprises:

calculating color coordinates of the blocks; and calculating the white balance gain based on the block statistical value of a block having color coordinates included in the identified achromatic color determination range.

11. A non-transitory computer readable recording medium having recorded thereon a program for executing the method of claim 6 on a computer.

12. A non-transitory computer readable recording medium having recorded thereon a program for executing the method of claim 7 on a computer.

13. A non-transitory computer readable recording medium having recorded thereon a program for executing the method of claim 8 on a computer.

14. A non-transitory computer readable recording medium having recorded thereon a program for executing the method of claim 9 on a computer.

15. A non-transitory computer readable recording medium having recorded thereon a program for executing the method of claim 10 on a computer.

* * * * *